Figure 1:
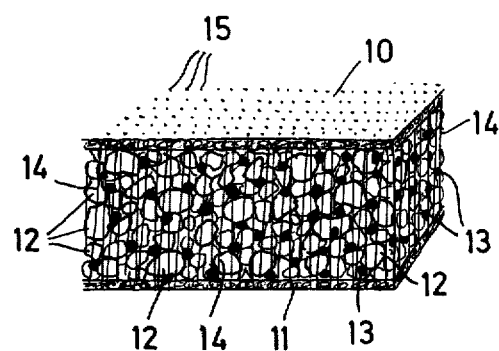

United States Patent [19]

Moroni et al.

[11] 3,925,248

[45] Dec. 9, 1975

[54] FILTER MEDIUM FOR GASES

[75] Inventors: Rolf Moroni, Bornheim-Hersel; Friedrich Karl Rinck, Wachtberg-Niederbachem; Peter Ehlenz, Vinxel, all of Germany

[73] Assignee: Collo Rheincollodium Koln GmbH Werk Hersel, Bornheim-Hersel, Germany

[22] Filed: Aug. 26, 1974

[21] Appl. No.: 500,520

Related U.S. Application Data

[63] Continuation of Ser. No. 251,080, May 8, 1972, abandoned.

[30] Foreign Application Priority Data

May 11, 1971 Germany............................ 2123159
Sept. 10, 1971 Germany............................ 2134587

[52] U.S. Cl. .................. 252/428; 252/430; 55/98; 55/318; 55/387; 55/524; 55/DIG. 13
[51] Int. Cl.² ......................................... B01J 31/06
[58] Field of Search ............... 252/428, 477 R, 430; 55/98, DIG. 13, 41, 5, 318, 524, 387

[56] References Cited
UNITED STATES PATENTS 3,381,454  5/1968  Sponsel................................. 55/528
3,477,210  11/1969  Hervert................................. 55/387

*Primary Examiner*—Patrick P. Garvin
*Attorney, Agent, or Firm*—Meyer, Tilberry & Body

[57] ABSTRACT

A filter medium for filtering gases to remove odoriferous, noxious substances therefrom, comprises sorbent and catalytic materials in the form of a fine powder admixed with a support material comprising small particles or flakes of an open pore, foam plastic material. The size of the pores in the foam plastic material is preferably greater than the particle size of the sorbent and catalytic material. The small sorbent and catalytic material particles are held in place by entrapment in the open pores and by surface (Van de Waals forces). The small particle size of the foam plastic material provides a large surface area to support the sorbent and catalytic particles.

The filter material may be provided between two layers of fabric which are sewed together through the filter material to form a coherent sheet of filter material. Cut sections of the sheet may be trimmed with a strip of plastic material.

7 Claims, 2 Drawing Figures

FILTER MEDIUM FOR GASES

This is a continuation, of application Ser. No. 251,080 filed May 8, 1972, now abandoned.

The present invention relates to a particulate filter medium for gases, and more particularly to a filter for air which is charged with noxious foreign gaseous substances.

Various types of filter substances, which can be used in granulated form in a bed or other permeable container are known for filtering gases. Usually, a more or less deep heaped layer or bed of filter substance is arranged in a gas-permeable filter chamber so that the gaseous medium to be filtered flows through the bed, and the substances to be filtered out are entrapped in the bed and then removed from the gaseous medium. An outstanding example of filters employing beds of granular material are the known activated carbon filters, which are widely used for filtering gases, particularly because of the high absorption power of the activated carbon.

However, despite their widespread use, the activated carbon filters are not free from disadvantages. A first disadvantage is the tendency of the activated carbon particles to break and form fine particles, even under only moderate mechanical stress. The soiling tendency of the fine particles thus formed is particularly troublesome and unpleasant when the filters are used for domestic purposes, for example, for air circulation hoods for kitchen fumes, in which the filter has to be replaced at intervals. Furthermore, the fine, abraded carbon particles can sometimes be discharged from the filter with the medium which is to be filtered. Furthermore, there is the danger of the bed of activated carbon particles or granules slipping in its mechanical holding means and in this way forming open, "short circuit" passageways, through which the medium to be filtered flows through the filter without coming into contact with the active carbon. In order to avoid this disadvantage, it has been proposed to use filter cartridges in the said kitchen air-circulation hoods, the granulated activated carbon being contained in perforated hardboard containers which are cut to trapezoidal form, a relatively large number of which are placed in the fume-extraction hood.

The activated carbon filters have the additional disadvantage that they have only a comparatively limited active life and consequently have to be replaced at regular intervals of, for example, about 6 to 12 months. It is an additional disadvantage that the absorption power of the activated carbon is dependent on temperature and absorbed substances are liberated again when the filter is heated to 40° - 50° C.

For removing gases, vapors, smells, and the like from gaseous media, particularly air, there are also known catalytically active filters, with which it is possible to achieve a catalytic reaction of the gaseous substances to be removed, even at normal room temperatures. In this connection, there are known filters in which a fine-pore, hydrophilic and open-cell synthetic plastic foam is used as support material for a catalytically acting reduction-oxidation system, the catalysts of the Redox system being incorporated in the cell structure of the foam. Often employed as Redox systems are oxides of polyvalent metals, such as manganese oxide, iron oxide, copper oxide, cobalt oxide, nickel oxide and silver oxide, alone or in combination. These substances are often added in the form of extremely fine grains, possibly together with substances, such as activated carbon, which have a sorbing action, to the starting mixture of chemicals used in making the foam plastic material, so that they are permanently and unreleaseably combined in the cell structure of the foam plastic material after the foaming operation has taken place.

Experiments have shown that a filter of this last-mentioned type, which is used in the form of webs or sheets, can be used with advantage, even at room temperatures, for destroying smells, particularly for eliminating unpleasant odors and noxious substances from the air, which consist, for example, of albumin decomposition products and the like.

The main object of the invention is to provide a loose bed filter which completely or substantially avoids the aforementioned disadvantages of the known activated carbon filters.

Another object of the invention is to provide a filter which is characterized by increased filtering efficiency and an improved effective life, with comparatively low flow resistance and which can accordingly be adapted in a simple manner to existing requirements.

According to the invention, the filter medium comprises a bed of small-size, open-pore foam plastic particles in the form of foam plastic flakes or granules to which are added active particles such as components of a Redox system, particles which have a sorbing action, and particles which have a sorbing and/or catalytic action. (As is well known, pores or cells are formed in the foam plastic material during its manufacture by entrapment of bubbles of gas therein.)

The size of the open-pore and hydrophilic foam plastic material particles to be used for the loose, filter bed is advantageously to be such that the foam plastic particles or at least a predominant proportion thereof are of a size which is below 10 mm. (The abbreviations used in this specification and claims have their usual meanings, i.e., mm = millimeter, m = meter, g = grams, l = liter, and $\mu$ = micron). The bed of filter material advantageously consists of a mixture of foam plastic particles of different sizes, at least the predominant proportion of which are particles having a size between 3 and 5 mm. By "predominant proportion" of foam plastic, catalytic or sorbent particles, as that term is used in this specification, it is meant that although most of the particles will fall within the specified size range, a small number of over-size particles usually survive the comminuting operation. Also, some undersize particles may be formed. Screening the comminuted particles through appropriately sized mesh screens will of course remove the wrong-size particles, providing substantially all the particles in the desired size range. Accordingly, the presence of a relatively few oversize particles compared to the total number of particles is a practical manufacturing problem which can be overcome, if warranted economically in a given case, by a screening step. Accordingly, particles of a specified size range may sometimes be expected to include some oversize (and some undersize) particles.

The average size of the open pores in the foam plastic particles can differ, depending on the purpose for which the filter according to the invention is used. It is generally between 0.3 and 4 mm, advantageously between approximately 0.5 and 2 mm.

In accordance with one preferred form of the invention, activated carbon in granule form is admixed with the loose bed of foam plastic particles. In this case, the proportion of activated carbon in the bed is 10 – 40% by volume, preferably 15 – 25% by volume. The ratio by volume between foam plastic material and active carbon is accordingly preferably adjusted to about 3:1 to 4:1, which corresponds to a ratio by weight between foam plastic material and active carbon of 1:3 to 1:4.

It was found that sorbing substances of small to ultrafine grain size, such as crushed or ground activated carbon, can be mixed in unexpectedly large quantities with a small-particle size foam plastic material, and that the "absorbing and fixing power" of the flaked or granulated foam plastic material is so great that the extremely fine-grain and dust-like activated carbon, in the aforesaid large quantities, is almost completely taken up by the foam plastic material and is bonded to the latter mechanically and also by surface forces (Van der Waals' forces), so that generally there cannot be any extensive separation of the two substances, even when strong mechanical stresses are imposed on the bed. Particularly favorable results as regards the absorbing and fixing power of the foam plastic material are obtained if the activated carbon is provided, at least to a predominant degree, in a particle size which is smaller, and preferably, considerably smaller than the average pore size of the foam plastic material, and if the foam plastic material is provided in the form of a fine flake or flock material, which is obtained by shredding synthetic soft foam on a flocking machine or the like. The term "flake" or "fiber" used to describe the foam particles obtained in the shredding is not intended to imply any particular shape of the particle. Irregular, different shaped particles are obtained by shredding the foam plastic material. Such a foam plastic material has a particularly irregular, rough and fibre-like structure, which considerably assists the binder-free adhesion (i.e., adhesion without the use of a glue or other extraneous binder material such as the known binder compositions which are applied as liquids or liquid suspensions) of the carbon particles to the foam plastic particles.

On the other hand, foam plastic particles which are medium hard to hard may be employed, either alone or with soft foam plastic particles. The foam plastic particles are preferably obtained by mechanical comminution and possibly subsequent screening of the particles to obtain the desired particle sizes.

The combination of foam plastic flakes, preferably of a soft consistency, with the fine-particle activated carbon, the latter preferably being completely or at least predominantly entrapped in an intimate distribution on the foam plastic material, provides a loose, granular filter material, which has outstanding properties in various respects. With such a mixture of loose materials, the activated carbon, as above-stated, is so bonded to the foam plastic material that any separation of the ultra-fine grain, dust-like, activated carbon from the mass of loose material is substantially prevented. Since the activated carbon is embedded in the small foam plastic material flakes, and the latter exert a certain cushioning or buffering action, there can be no strong abrasion of the activated carbon particles, even with relatively strong swirling or shaking movements of the loose material. This is more especially important when the filter according to the invention is used with portable equipment, as for example with appliances constructed in the manner of electric space-heating appliances for filtering the air in the rooms.

Another advantage of the filter according to the invention is that, because of the activated carbon particles being mixed with the small-size foam plastic material flakes, resistance of the filter to gas flow can be considerably reduced, as compared to a conventional activated carbon filter. Consequently, it becomes possible to work with comparatively large heights of the filter bed, or bed thickness of the loose flake material filter, which in turn provides the advantage of long filtering flow paths and long contact times between the filter material and the gaseous medium which is to be filtered.

The filtering efficiency is also improved in accordance with the invention, by the increase in the active filter surface, which results from the use of the small-size foam plastic material broken down to a greater or lesser degree into fine flakes or fibres. With filter material flakes or fibers in accordance with the invention, the flakes or fibers can undergo a circulatory movement and moderate swirling movement under the action of the gaseous medium flowing under pressure through the filter without this leading to significant abrasion of the active particles or to a separation of the materials. These circulatory and swirling movements also improve the contact between the medium to be filtered and the active filtering substances, and has the effect that new filtering flow paths and contact surfaces for the medium to be filtered are constantly being formed in the filter.

According to a preferred constructional form, one filter in accordance with the invention includes fine particles of one or more substances of a Redox system, which are distributed in the mass of loose plastic material flakes, along with other substances in fine particle form which have a sorbing action. The catalytically active substances are preferably bonded to the foam plastic, i.e., are added to the reaction mixture of the foam plastic when the latter is manufactured, so that they are "incorporated" by foaming into the foam plastic. However, it is also possible for the catalytically acting substances or other additives in extremely fine-grain form to be admixed with the loose mass of foam plastic flakes, so that they are introduced into the pores of the foam plastic material, in the same manner as the activated carbon.

In a filter of the last-mentioned type, the activated carbon particles are thus arranged in finely distributed form and in intimate contact with the catalytically active particles of the Redox system, the latter being combined with the foam plastic material flakes, so that noxious substances to be filtered out and bonded by absorption by the activated carbon are held within the effective range of the catalyst particles and thus are able to be degraded chemically with the aid of the catalysts. Reference in this specification to "absorption" or to absorbent material shall be deemed to include "adsorption" and adsorbent materials, i.e., to mean sorbtion or sorbing in general, whether by absorption, adsorption, or both. "Sorbent" materials, referred to in the claims, shall mean adsorbent and/or absorbent materials.

It is important for efficient filtering action of the filter according to the invention, that the storage capacity of the filter, i.e., the absorption power of the foam plastic flakes and of the active carbon incorporated therein, is matched to the degradation power of the catalytic substances of the Redox system. Tests have shown that a particularly favorable ratio between storage capacity and degradation power is obtained if the proportion of activated carbon in the foam plastic material is between approximately 20 – 25% by volume of the volume of the foam plastic material (before comminution) and if the proportion of the catalytically active substances of the Redox system is between approximately 5 – 18% by weight of the weight of the foam plastic material.

A filter of this aforementioned type has excellent properties, particularly for filtering from the air and destroying by oxidation kitchen fumes and other evil-smelling gases, particularly those containing sulfur or nitrogen, such as for example, albumin decomposition products, acrolein, carbohydrate decomposition products, aldehydes, ketones and hydrocarbons. The filter according to the invention thus provides an extremely efficient filtering system, in which the sorbing substances and the chemically active substances of the Redox system are provided in a distribution of extremely fine particles in completely intimate contact with one another, and which at the same time has a extraordinarily large active filtering surface. The total surface area is further increased by the comminution of the foam plastic to form it into small particles or fibers.

The destruction by adsorption and oxidation of the gaseous odorous and noxious substances can be carried out in a low temperature range, even in the room temperature range (about 20° to 23°C). Consequently, the filter according to the invention can be used with particular advantage domestically, for example, for removing odors from refrigerators, in fume removal hoods for kitchens, for removing smells in living rooms, assembly halls and factory shops, in ventilation and air-conditioning installations, etc.

As mentioned, the catalytically active substances, consisting of heavy metals, metal hydrates or oxides, as for example the oxides of iron, manganese, cobalt, nickel, copper, silver, etc., are advantageously incorporated into the foam plastic during the foaming, so that they are combined in the foam plastic cell structure itself in extremely finely divided form. (Reference in all cases to the metals of the oxides noted above includes the metals in their various known valance states, e.g., ferrous and ferric, manganic and manganous, etc.) To obtain optimum efficiency in the low temperature range, it is particularly important that the filter particles during use, have a certain minimum humidity. A monomolecular water layer on the filter particles is sufficient for this purpose.

On the other hand, the specific catalytic reaction which destroys the offensive substances depends on a certain pH range of the filter being maintained. Thus, a Redox system consisting of the oxides or iron, manganese and copper is particularly effective in the pH range from 8 – 8.5 when potassium ions are also present, whereas, for example, a Redox system consisting of tha oxides of the metals iron, manganese, cobalt or nickel is particularly effective in the pH range from about 2.4 – 2.6.

The desired pH ranges for specific systems are obtained by suitable additions of reactants at the time of producing the foam plastic material, in a manner well known in the art. The particular Redox system and corresponding pH range selected, and the manner of obtaining the same form no part of the present invention, which is useable for any known catalytic system.

The proportion of the catalytically active substances incorporated in the foam plastic material at the time of foaming is preferably between about 5 – 18% by weight and preferably between about 5 – 10% by weight, relative to the weight of the foam plastic. For the foam plastic flakes, an open-pore and hydrophilic polyurethane foam material of soft consistency is advantageously used, although other hydrophilic foam plastic materials, such as polyvinylalcohol foams or phenol resin foams, are also suitable.

Other sorbent substances, such as bentonite, kieselguhr, alumina, silica gel, and, in general, fiber materials, preferably in amounts up to about 10% by volume (related to the volume of foam plastic before comminution), and catalytically active substances other than those mentioned above may also be used, in amounts up to about 18% by weight (relative to the weight of foam plastic) instead of, or in addition to, the activated carbon.

The filter material according to the invention preferably employs as its base foam plastic filtering materials of known type, which may comprise, for example, an open-cell, hydrophilic foam plastic (polyurethane foam) with catalytically active substances of a Redox system incorporated therein during the foaming. The material is torn by means of a flocking machine or the like, with the shredded material being thereafter screened on a sieve with a screen mesh size of 10 mm. The material which passes through the sieve provides a soft elastic flock material with a particle size of a maximum of 10 mm with a considerable proportion of said material having a particle size of less than 10 mm. The flock mixture thus obtained is then intimately mixed in a ratio by volume of 3:1 to 4:1 with crushed activated carbon, this preferably being carried out by means of a mechanical mixer. The activated carbon preferably has a grain size below about 3 mm and advantageously below about 1 – 2 mm, a considerable proportion of the active carbon being in the grain size range of 30 – 100 $\mu$.

As mentioned, the filter according to the invention can be used for many purposes. It can advantageously be employed in all those cases where previously the known activated carbon filters were used. The filter according to the invention is preferably employed for removing unpleasant odors or other undesired or noxious gases from the air, such as particularly for removing odors resulting from cooking and baking, tobacco smoke, alcohol fumes and human perspiration from the air.

When filtering air or other gases, it is expedient to use a foam plastic flock material (more especially polyurethane) which is of soft consistency and of a density, as comminuted material, of between about 10 – 100 g/l, preferably, 30 – 60 g/l. Bentonite, which is preferably incorporated into the foam plastic at the time of foaming, is particularly useful for the destruction of albumin decomposition products. Several examples are given below:

EXAMPLE 1

For the production of a catalytically active, hydrophilic, open-cell foam plastic material of soft consistency, 125 parts by weight of a polymeric product of ethylene diamine with propylene oxide and ethylene oxide and 125 parts by weight of a polypropylene oxide-ethylene oxide mixed product are neutralized with 25 parts by weight of 10% sulphuric acid, whereafter there are added 50 parts by weight of montmorillonite powder (bentonite), 15 parts by weight of dehydroaluminium silicate of a molecular sieve type, 3 parts by weight of water, 2 parts by weight of tin dioctoate, 9.6 parts by weight of potassium permanganate and 6.9 parts by weight of basic copper carbonate, stirring taking place until a uniform mixture is obtained and the temperature is adjusted to 20°C. Using an intensive mixer, 60 parts by weight of toluylene diisocyanate are added to the said mixture, which is stirred to a creamy consistency and poured into a vessel which can be cooled. A light soft elastic foam is quickly formed, and this is cured at about 50°C and with a residence time of 1 hour in a drying chamber.

The polyurethane foam as thus formed contains manganese oxide and copper oxide as catalytically acting substances in extremely finely divided form bonded into its cell structure, and is thereafter comminuted by means of a flocking machine and then screened on a 10 mm screen. The material passing through the screen thus has a particle size below 10 mm, the greatest proportion of the foam plastic flakes being in the range of between about 2 – 5 mm. in size.

The flock or flaked material obtained in this way is then mixed in a mixer with finely crushed activated carbon, the proportion of the added activated carbon amounting to 25% by volume, relative to the volume of the unflaked foam plastic, i.e., the volume before comminution. The grain size of the activated carbon is, for example, below 1 mm. preferably between about 50 $\mu$ and 1 mm.

The mixture of loose materials obtained in this way can now be introduced into a gas-permeable filter chamber of a filter, the height of the layer of material, i.e., the bed thickness of the filter material, being adapted to the purpose for which the filter is to be used. Since the foam plastic flakes are soft and elastic, the mixture of loose material can be compressed to a greater or lesser degree in the filter chamber, and by the amount of compression, the filter resistance can be adjusted within comparatively wide limits. Such a filter is particularly suitable for filtering gases, particularly air, which is charged with gaseous foreign substances, as for example unpleasant odorous substances (kitchen fumes), tobacco smoke, alcohol vapours, human and animal perspiration, hydrogen sulphide, sulphur dioxide and other evil-smelling gases and noxious substances.

EXAMPLE 2

Instead of the polyurethane foam material mentioned in Example 1, it is also convenient to use a foam plastic material made with the following ingredients:

| | | |
|---|---|---|
| Polyoxypropylene glycol | 10 | parts by weight |
| Condensation products of ethylene oxide and propylene oxide with ethylene diamine | 10 | " |
| Sulphuric acid | 0.02 | " |
| Hydrogen peroxide | 0.04 | " |
| Glycerine | 0.10 | " |
| Methylene Chloride | 0.60 | " |
| Bentonite (finely ground to below 50$\mu$, preferably below 10 $\mu$) | 3.60 | " |
| Potash | 1.20 | " |
| Molecular seive material | 1.20 | " |
| Catalystic substances of the Redox system, namely: | | |
| Manganese hydroxide | 3.60 | " |
| Cuprous oxide | 2.40 | " |
| Ferric hydroxide | 0.70 | " |
| Zinc oxide | 1.20 | " |
| | 34.66 | parts by weight |
| Toluylene diisocyanate | 15.0 | parts by weight |

The flaking or shredding of this polyurethane foam material and the mixing of the activated carbon into the flaked material is effected in the same manner as in Example 1.

EXAMPLE 3

To the initial foam plastic mixture of the polyurethane foam mentioned in Example 2 are also added between 5 – 20 and preferably between 8 – 15 parts by weight of activated carbon with a grain size below 3 mm, preferably below 1 mm, so that the activated carbon, during the foaming operation, is incorporated together with the other fine granular additives into the cell structure of the foam plastic.

The soft foam material thus produced is thereafter flaked, screened through a 10 mm screen and mixed with active carbon, as done in Example 1.

In one embodiment of the invention, the loose, particulate filter material as described above, consisting of open-pore, hydrophilic foam plastic particles in combination with the other additives, preferably composed of a mixture of foam plastic flakes and granulated activated carbon and containing the catalytically acting substances, is contained between two fibre fabrics or fleeces and stitched or quilted with the fleeces, to form a coherent filter body. It was found that a foam plastic flake material with the said additives can be surprisingly well stitched to fibre fleeces or fabrics and that it is possible to use light and thin porous fibre fleeces with a weight of between about 50 – 200 g/m², preferably between about 80 – 120 g/m², without there being any danger of the loose material stitched between the fibre fleeces trickling out of the cloth-like filter body thus formed. The stitching of the loose mixture leads to a coherent filter body which, depending on thickness, is more or less pliable and at the same time highly porous, which body has an exceptionally large effective filter surface and of which the air resistance can be adjusted within wide limits by the nature and particle size of the flake material and also by the density and thickness of the stitched or sewn flake layer. The thickness of the bed of loose mixture sewn between the fibre fleeces may be, for example, between about 5 to 30 mm, preferably between about 10 to 20 mm.

For the fibre fleeces, it is possible to use those fleeces which consist of natural or snythetic fibres, such as more especially cellulose fibres, cotton fibres, polyacryl, polyamide or polyvinyl fibres and the like, which have a weight of between about 50 – 200 g/m², a thickness of between about 0.5 to 3 mm, preferably between about 1 to 2 mm, and of which the fibre length depends on the desired thickness of the filter body. In general, the fibre length is between about 40 and 130 mm. The number of stitches (needling) per cm² of fleece surface is between about 20 – 100, preferably between about 40 – 80.

To prepare the filter body, a mixture of foam plastic flakes (with incorporated catalysts) and activated carbon is placed on a fibre fleece in a bed height of between about 10 – 50 mm, preferably about 15 – 30 mm, and smoothed by a doctor roller or the like. The fleece is, for example, a cellulose fleece, with a surface weight of between about 80 – 120 g/m² and a thickness of between about 1 – 2 mm. After placing a covering fleece, which preferably corresponds to the bottom fibre fleece, over the bed of flakes, the complete laminated body thus formed is sewn or woven on one or both sides by means of known devices, the number of needle insertions per square centimeter being between 20 and 100. The sewing or weaving of the laminated body can be carried out in such a way that the layer thickness of the bed of loose flake material is somewhat reduced, with more or less strong elastic compression of the foam plastic flakes. It is possible in this way to adjust the porosity and thus the air permeability of the filter, and also the strength of the filter system, to desired values.

By means of the sewing or weaving method as previously described, there is thus obtained a filter in the form of a cloth, a sheet or a continuous length or the like, which can subsequently be cut into individual filter sheets.

To prevent the flake or grain material from crumbling or breaking away slightly at the place of cutting when the sheet-like filter body is cut, it is expedient to fasten, as by sewing, strip-like or bar-like edge frames, particularly of a soft, elastic foam plastic, on to the cut margins of the filter body. Such strips can, in addition, also be stitched inside the web for strengthening the sheet.

Several thin filter cloths or filter sheets of the aforesaid type can be connected one behind the other or laid one upon the other, so that a multi-layer body is obtained. Multilayer filters can also be produced in one working step by fibre fleeces or woven fabrics being interposed between successive layers of filter flake materials.

FIG. 1 shows diagrammatically and in simplified form a section through a filter body according to the invention. Indicated at 10 and 11 are the two fibre fleeces of natural or synthetic fibres, between which the flaked and granulated active filter material is sewn, and which preferably have a surface weight of between about 80 – 120 g/m². Indicated at 12 is the flaked foam plastic material, in which the catalytically active substances of the Redox system are, in the known manner, incorporated during the foaming. The particle size of the flake material is smaller than about 10 mm, a considerable proportion thereof being in the range from 1 – 5 mm. This foam plastic flake material is mixed with the fine-grain, adsorbing material, this latter being almost completely contained in the open pores of the foam plastic and being attached to its fibrillated cell walls.

Individual activated carbon granules are indicated at 13. The sewing of the material which is situated between the fibre fleeces 10 and 11 is effected by means of known devices, the fibres of the fleeces 10 and 11 being drawn through the flake and grain material. These fibres are indicated at 14 in FIG. 1. Because the fibres of the two fleeces are anchored to the foam plastic flakes and to one another, there is produced a coherent but porous filter body, in which the flake and grain material is so held that it cannot crumble or break away from the said material. The number of needle insertions per square centimeter is preferably between 20 and 100. The needle insertions are indicated at 15 in FIG. 1.

Figure 2:
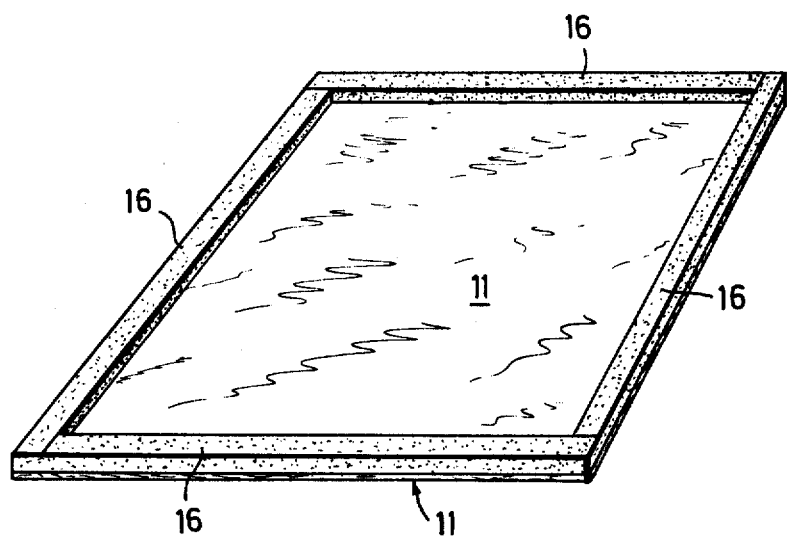

If the filter bodies according to the invention are for example cut into rectangular sheets, it may happen that the sewn ultra-fine grain material will crumble away slightly at the cut edges. In order to avoid this, a marginal frame 16 can be provided as shown in FIG. 2. The frame 16 here consists of narrow synthetic plastic strips, which are laid on the margins of the lower fibre fleece 11. The flake and grain material is then introduced into the space between the framing strips 16, whereupon the upper fibre fleece 10 is laid on the loose material which has been spread out flat and then sewn in the manner described. The edge strips 16 are sewn between the two fibre fleeces 10 and 11.

Reference to "sewing" or "sewn" in this specification and claims is intended to include all modes of fastening by the means of threads or fibers, such as weaving, sewing or the like.

In order to increase the tensile strength and the dimensional stability of the filter according to the invention, the filter bodies can be provided with reinforcing inserts, such as additional fibre fleeces or porous woven fabric inlays, which are sewn into the composite body. These inserts can be laid in the flake layer and/or placed flat against the fibre fleeces. In this way, it is possible to produce multi-layer filters in one working step with interposition of alternate layers of fibre fleeces or woven fabrics and filter materials. The uniting of the fibre fleeces and the flake layers, and of the additional inserts if used, can also be obtained by a chain-stitch sewing operation as known per se, or by a quilted stitch sewing operation.

Loose material filters of the type referred to in examples 1 to 3 can be used effectively at temperatures up to about 90°C. The filters are highly effective, even at temperatures which are in or below the room temperature range.

When, in the claims, percents by volume of the filter material components relative to the volume of foam plastic are given, they are based on the volume of the foam plastic material in bulk, i.e., before its comminution into particles or flakes.

While the invention has been described with reference to certain embodiments thereof, it is intended to include within the scope of the invention all modifications which fall within the scope of the claims appended hereto, or their equivalents.

What is claimed is:
1. A filter material for filtering air to remove noxious substances therefrom comprises an intimate mixture of the following particles in a loose bed;
 a. a prefoamed plastic material in the form of flakes, said flakes containing open pores and being obtained by comminuting an open pore hydrophilic prefoamed plastic material which has an average pore size of between 0.3 to 4 mm and contains reduction-oxidation catalyst particles incorporated into said prefoamed plastic material during the foaming thereof; and
 b. particles of activated carbon in a ratio of about 10–40% by volume with respect to said prefoamed material, at least a predominant proportion of which particles have an average particle size substantially less than the average pore size of said pre-foamed plastic material, whereby adhesion of said activated carbon particles to said flakes is attained by binder free mechanical bonding so that separation of said activated carbon particles from said mixture is substantially precluded.

2. The filter material of claim 1 wherein the pre-foamed plastic flakes are less than about 10 mm in size.

3. The filter material of claim 2 wherein the pre-foamed plastic flakes are between about 3 mm and 5 mm in size.

4. The filter material of claim 1 wherein said activated carbon particles are of a size less than about 3 mm.

5. The filter material of claim 4 wherein the size of said activated carbon particles is less than about 1 mm.

6. The filter material of claim 5 wherein the size of said carbon particles is between about 30 $\mu$ to 100 $\mu$.

7. A filter material as defined in claim 1 wherein said flakes are soft and elastic.

* * * * *